C. P. Lenz.
Extension Table.

No. 3,949. Reissued May 3, 1870.

Witnesses.
A. Bennewitz Jr.
Wm. F. Clark

Inventor
C. P. Lenz
Munn & Co.
Attorneys.

N. PETERS, PHOTO-LITHOGRAPHER, WASHINGTON, D. C.

United States Patent Office.

CHARLES PHILIPP LENZ, OF POUGHKEEPSIE, NEW YORK.

*Letters Patent No.* 94,617, *dated September* 7, 1869; *reissue No.* 3,949, *dated May* 3, 1870.

IMPROVED EXTENSION-TABLE.

The Schedule referred to in these Letters Patent and making part of the same.

*To all whom it may concern:*

Be it known that I, CHARLES PHILIPP LENZ, of Poughkeepsie, in the county of Dutchess and State of New York, have invented a new and useful Improvement in Extension-Tables; and I do hereby declare that the following is a full, clear, and exact description thereof, which will enable others skilled in the art to make and use the same, reference being had to the accompanying drawings forming part of this specification.

This invention relates to new and useful improvements in extension-tables, and consists in the construction and arrangement of the metallic slides, rails, and in the combination of the same with the frame, as hereinafter more fully described.

In the accompanying plate of drawings—

Similar letters of reference indicate corresponding parts.

Figure 4:
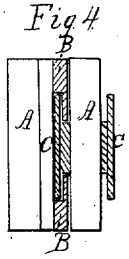
Figure 4 represents a detail cross-section, on a larger scale, of the extension-rails, showing the method of forming the grooves and tongues.

The tongues and grooves of the extension-rails of this table are formed of metal plates, as seen in fig. 4, where A represents the rails;

B, the groove-pieces; and

C, the tongue-pieces.

Figure 1:
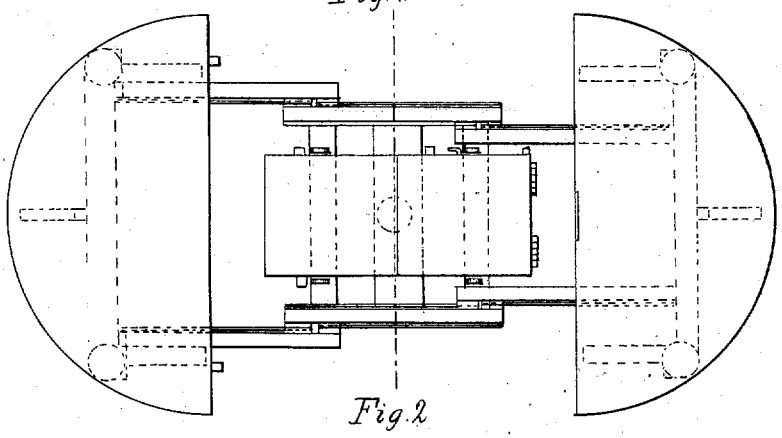
Figure 1 represents a plan view of the table, and showing it with the inner plates removed.

The tongue-pieces are T-shaped bars, as shown, while the groove-pieces are short plates, applied merely to the ends of the rails, as indicated in fig. 1.

These pieces B and C are made of metal, and may be rebated or set out from the rail by intervening strips, so as to form tongues and grooves, as seen in the drawings.

Forming the grooves and tongues by means of metallic plates, as represented, allows the rails to freely slide back and forth.

The shrinking, swelling, or warping of the rails does not interfere with the proper working of the table, while, by this arrangement, the space usually taken up by the rails of an extension-table is so much reduced that ample room is left between them for storing the filling leaves, when the table is not extended.

D, E, and F represent the extension leaves or filling of the table. These pieces are made of suitable construction and form, and can either be placed between the regular leaves K, when the table is extended, as in fig. 2, or they are stored away within the table, as in fig. 3, in which case they are supported by cross-bars that connect the separately-supported middle pair of rails, as shown in fig. 1.

By this arrangement and formation of the table, I obtain sufficient space between the rails for storing the extension-leaves where they are entirely out of sight, and out of the way when not in use. This is a very important consideration, as, with the common extension-table, a separate box or rack must be provided for the extension-leaves. The table may be of suitable form and size.

I am aware that metallic tongue and groove-pieces have already been in use, but never yet were the same so applied as to leave room within the table for the storing away of the extension leaves.

Figure 2:
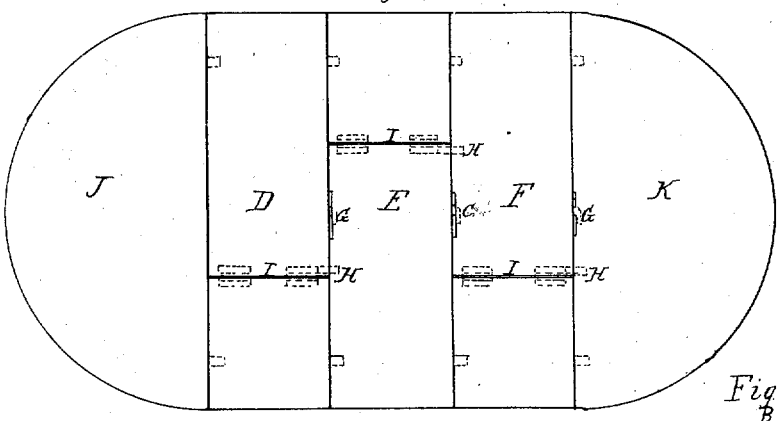
Figure 2 is a plan or top view of the same, showing the inner leaves in place.
Figure 3:
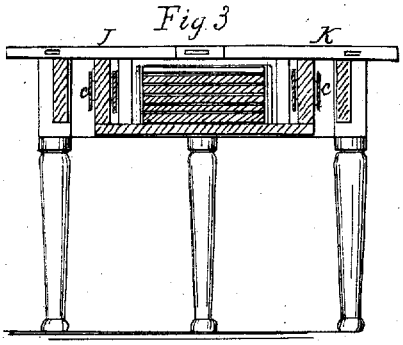
Figure 3 is a vertical cross-section of the same.

The invention consists, also, in providing hooks, G, on, and corresponding sockets in, the edges of the leaves, so that the latter, when used on the table, may be hooked together, as indicated in fig. 2. These hooks prevent the leaves from tipping over when the dowel-pins have been lost or worn by use. They also serve to always lock the leaves firmly together, and to thereby protect table-cloths placed upon them, and prevent the table from being accidentally drawn apart.

Having thus described my invention,

I claim as new and desire to secure by Letters Patent—

1. The combination of the rails A A, metallic groove-pieces B B, and tongues C, with a sliding extension frame and removable leaves, all the said parts being arranged with respect to each other so that room is formed in the table for storing away the extension leaves, as set forth.

2. The combination of the hooks G, with corresponding sockets on the edges of the leaves, as and for the purpose described.

CHARLES PHILIPP LENZ.

Witnesses:

JOSEPH BAYER,

FR. SCHAUMBURG.